United States Patent
Leshniak et al.

(10) Patent No.: US 9,693,431 B1
(45) Date of Patent: Jun. 27, 2017

(54) NEAR FIELD COMMUNICATION DEVICES, METHODS AND SYSTEMS

(71) Applicant: AMERLUX LLC, Oakland, NJ (US)

(72) Inventors: Itai Leshniak, Fair Lawn, NJ (US); Jonathan Yi, Cedar Knolls, NJ (US)

(73) Assignee: AMERLUX LLC, Oakland, NJ (US)

( * ) Notice: Subject to any disclaimer, the term of this patent is extended or adjusted under 35 U.S.C. 154(b) by 0 days.

(21) Appl. No.: 14/829,425

(22) Filed: Aug. 18, 2015

Related U.S. Application Data

(60) Provisional application No. 62/039,297, filed on Aug. 19, 2014.

(51) Int. Cl.
*H05B 37/02* (2006.01)
*H04W 4/00* (2009.01)
*H05B 33/08* (2006.01)
*H04B 5/00* (2006.01)

(52) U.S. Cl.
CPC ....... *H05B 37/0272* (2013.01); *H04B 5/0062* (2013.01); *H05B 33/0893* (2013.01)

(58) Field of Classification Search
None
See application file for complete search history.

(56) References Cited

U.S. PATENT DOCUMENTS

| | | | | |
|---|---|---|---|---|
| 2012/0139417 A1* | 6/2012 | Mironichev | ....... | H05B 33/0842 315/86 |
| 2012/0228529 A1* | 9/2012 | Trewin | ....... | H01F 38/14 250/551 |
| 2013/0026947 A1* | 1/2013 | Economy | ....... | H05B 37/0272 315/287 |
| 2013/0200811 A1* | 8/2013 | Steininger | ....... | H05B 37/0245 315/159 |
| 2014/0244044 A1* | 8/2014 | Davis | ....... | H05B 37/0272 700/276 |
| 2014/0256251 A1* | 9/2014 | Caceres | ....... | H04B 5/0031 455/41.1 |
| 2014/0277805 A1* | 9/2014 | Browne, Jr. | ....... | H02J 4/00 700/295 |
| 2014/0320021 A1* | 10/2014 | Conwell | ....... | H04W 4/001 315/152 |
| 2014/0333207 A1* | 11/2014 | Saes | ....... | H04L 12/417 315/132 |

\* cited by examiner

*Primary Examiner* — Dedei K Hammond
(74) *Attorney, Agent, or Firm* — Day Pitney LLP

(57) ABSTRACT

A Near Field Communication (NFC) tag placed inside a light fixture is provided with information by using a commissioning device such as a smartphone or other dedicated tool. For example, in one implementation, a light fixture in a smart lighting control system can be provided with a microcontroller that has access to the memory of a NFC tag. A commissioning device or tool with GPS and NFC capabilities obtains and writes GPS coordinates to the memory of the NFC tag. After the fixture is connected to the network, the smart system can then access the written GPS coordinates from the memory in the NFC tag. Based on this information, a user with access to the microcontroller (e.g., via computer network) can view the map of fixtures based on the obtained coordinates.

14 Claims, 1 Drawing Sheet

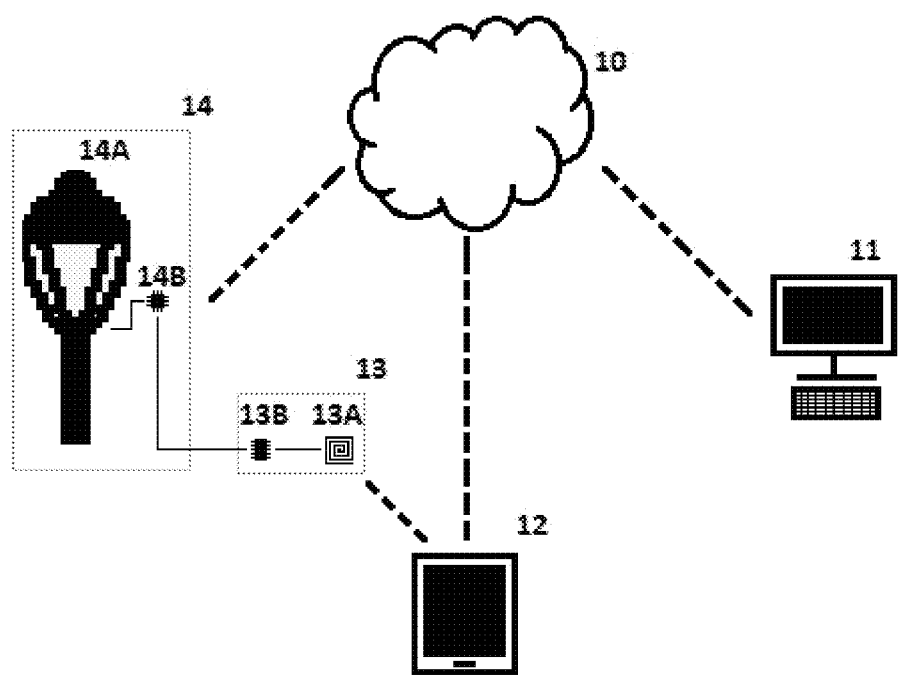

NEAR FIELD COMMUNICATION DEVICES, METHODS AND SYSTEMS

CLAIM TO PRIORITY

This application claims the benefit under 35 U.S.C. §119 to U.S. Provisional Patent application Ser. No. 62/039,297, filed on Aug. 19, 2014. The Provisional Patent application upon which priority is based is incorporated herein in its entirety for any purpose whatsoever.

FIELD OF THE INVENTION

The present disclosure relates to lighting systems and in particular, to devices, methods and systems for a near field communication tag adapted for use in lighting systems.

BACKGROUND

Various emerging smart lighting control systems have a feature that allows users to view a "map" of light fixtures. This map component requires known location points to represent each light fixture. Typically there are two approaches for obtaining location points for a map of fixtures: inclusion of a Global Positioning System (GPS) module in the fixtures or manually plotting a map with the locations of the fixtures "by hand". Applicant has appreciated that adding a GPS module to the light fixtures is not cost-effective since the fixture locations are static and only need to be recorded once. Moreover, applicant has appreciated that manually plotting a map with the fixture locations "by hand" still requires coordinates or at least approximations based on topography (for example, setting the map marker of "Pole A" on the northeast corner of a parking lot). Furthermore, mapping by hand is labor intensive and not scalable for a large number of fixtures. These two methods add extra cost and man-hours to the commissioning process of a light fixture in a smart system with a fixture-map application.

Another technique for creating a map of fixtures is to use a peripheral device with GPS capabilities. In this method, an individual arrives at a fixture location, records the GPS coordinates using the peripheral device, and then uses the recorded coordinates for mapping the light fixtures. There are many variations of this tactic. One specific example has a GPS device that scans data from a barcode on the light fixture (such as the fixture's unique ID). This way the map displays the coordinates of the scanned barcode data. Like the previous two implementations, applicant has come to appreciate that this barcode approach has some limitations. One drawback is the possibility of a label or barcode being incorrectly applied to a light fixture, thus providing a false representation of a fixture's location (for example, the labels for Pole A and Pole B were switched so after scanning, the map shows Pole A at Pole B's location and Pole B at Pole A's location). Another problem is that the barcode labels are subject to the environment. Labels may become separated from the fixture or fade from exposure to sunlight or liquid (i.e. rain or snow) and cause the barcode to become unreadable.

SUMMARY

The present disclosure provides embodiments and technique to write information, such as but not limited to Global Positioning System (GPS) coordinates and/or other information to the memory of a Near Field Communication (NFC) tag placed inside a light fixture by using a commissioning device such as a smartphone or other dedicated tool. For example, in one implementation, a light fixture in a smart lighting control system can be provided with a microcontroller that has access to the memory of a NFC tag. A commissioning device or tool with GPS and NFC capabilities obtains and writes GPS coordinates to the memory of the NFC tag. After the fixture is connected to the network, the smart system can then access the written GPS coordinates from the memory in the NFC tag. Based on this information, a user with access to the microcontroller (e.g., via computer network) can view the map of fixtures based on the obtained coordinates.

BRIEF DESCRIPTION OF THE FIGURES

FIG. 1 is a simplified diagram of an example of a smart lighting control system in accordance with the disclosure.

DETAILED DESCRIPTION

The present disclosure provides improved lighting systems that exploit the advantages of NFC technology. Near-field communication uses magnetic induction between two loop antennas located within each other's near field, effectively forming an air-core transformer. It typically operates within the globally available and unlicensed radio frequency ISM band of 13.56 MHz. Most of the RF energy is concentrated in the allowed ±7 kHz bandwidth range, but the full spectral envelope may be as wide as 1.8 MHz when using ASK modulation. Theoretical working distance with compact standard antennas: up to 20 cm (practical working distance of about 4 cm). Supported data rates typically include 106, 212 or 424 kbit/s. NFC can be configured to operate in two modes. In a passive communication mode, the initiator device provides a carrier field and the target device answers by modulating the existing field. In this mode, the target device may draw its operating power from the initiator-provided electromagnetic field, thus making the target device a transponder. In an active communication mode, both the initiator and target devices communicate by alternately generating their own fields. A device deactivates its RF field while it is waiting for data. In this mode, both devices typically have power supplies.

For purposes of illustration, and not limitation, an exemplary lighting system in accordance with the disclosure is illustrated in FIG. 1. The light fixture 14 includes a microcontroller unit (MCU) 14B that controls the electric lamp or luminaire 14A. In addition, the MCU 14B allows the light fixture 14 to connect to a network 10 such as the Internet or a smart lighting control system. The Near Field Communication (NFC) tag 13 contains an antenna 13A and memory 13B such as EEPROM (Electrically Erasable Programmable Read-Only Memory). The MCU 14B in the light fixture 14 is connected to and has access to the memory 13B of the NFC tag 13.

While any suitable NFC tag can be used, it is currently preferred to utilize a M24SR series NFC tag, available form ST Microelectronics having a NFC forum tag type 4 RF interface (based on ISO 14443 RF interface) that supports the NFC data exchange format (NDEF). This permits NFC use cases such as simple Bluetooth pairing and other connection handovers, automatic links to URLs, storage of Vcard and other types of information. The tag includes a 1 MHz I$^2$C serial interface operating from 2.7 to 5.5 V, EEPROM memory density from 2 Kbits to 64 Kbits with built-in NDEF message support, a RF disable pin allowing the application to control RF access from NFC phones, 128-bit password protection, and a general-purpose output pin.

The commissioning device 12 has NFC and Global Positioning System (GPS) capabilities and communicates with the antennae 13A in the NFC tag 13 and may also access the network 10. The tool for commissioning 12 can write its GPS coordinates or other information to the memory 13B of the NFC tag 13 via the antennae 13A. A user 11 on a computer or other network machine can access the smart lighting control system via the network 10 and view the map of light fixtures 15 based on the accessible GPS coordinates in memory 13B written by the commissioning device 12.

The NFC tag 13 has readable and writable memory 13B so data can be transferred to and from the tag via radio frequency and/or serial communication. The MCU 14B electronically controls and connects the light fixtures 14 to a network 10 such as the Internet or backend of a smart lighting control system. In addition, the MCU 14B also interacts with the memory 13B of the NFC tag 13 if the serial bus of the tag is powered. If desired, the NFC tag 13 can draw power from the same source as the MCU 14B. This can permit the NFC tag to operate in an active mode. The commissioning device 12 is able to read and write data to the memory 13B of the NFC tag 13 via radio frequency and has GPS capabilities so that coordinate data can be obtained. The NFC tag 13 does not require power when reading or writing via radio frequency. Once the NFC tag 13 is detected by the commissioning device 12, the commissioning device obtains its current GPS coordinates and writes that information to memory 13B in the NFC tag 13.

If desired, the commissioning tool can read data from the NFC memory 13B and upload the data and coordinates to the network w. The smart lighting control system can display a map of fixtures 14 by accessing the GPS coordinates written to the memory 13B of the NFC tag 13. Users can interact with the smart lighting control system via a network-connected device such as a computer 11.

There are significant advantages for including NFC tags inside light fixtures for smart lighting control systems. NFC tags are unobtrusive since they have relatively small size and need only four wires, including power, for $I^2C$ protocol communication to the fixture's MCU. NFC tags reduce the cost and time for commissioning since there is no plotting maps by hand and no need for GPS modules. All that is required to map the fixtures is for the smart system to access the stored coordinates from the memory of the NFC tags. NFC tags are convenient because power is not required for RF communication. This means that a commissioning device with GPS can assign coordinates the memory of the NFC tag at any time (pre-fixture install, post-fixture activation, or between fixture installation and activation).

The commissioning device 12 can take a variety of forms. In accordance with one embodiment, the commissioning device 12 can be a general purpose computer having NFC and GPS capability, such as a smartphone running a specialized application ("app") for communicating with the light fixture. In other implementations, the commissioning device 12 can be a dedicated or specialized device having GPS and NFC capabilities and software configured for inputting GPS coordinates into the NFC memory, after which the MCU of the fixture can read the GPS coordinates and transmit them via network to an end location. In any event, the system is preferably configured to write the media access control, or "MAC" address of the MCU to the NFC device in the fixture, permitting the commissioning device 12 to read the MAC address in the commissioning process.

There are many other applications for inserting NFC tags inside light fixtures. Some specific examples are for manufacture, installation, commissioning and diagnostic purposes.

Many companies have quality control (QC) stages during the manufacturing process of products. Information can be written to NFC tags such as: QC phase, job names, group names, manufacture dates, product IDs, serial numbers, timestamps, individuals and facilities involved in the manufacture and QC process, and other traceability aspects.

NFC tags can also be used to track shipment. For example, the NFC tag can be coded with the ship date of the item to a customer, GPS coordinates of the shipment location, and so on. This information can be uploaded (e.g., automatically) into a warranty database, so that the computer system tracking customer warranties can accurately measure the warranty period of the fixture. The GPS information can be updated at various stages of the shipment process.

NFC tags can also be used during the installation process of the light fixture. For example, the system can be installed, and the commissioning device 12 can be used to log the GPS coordinates to the NFC tag. When the lighting system is activated, the MCU can query the NFC tag for the geo-coordinates and upload them to the network or the cloud, etc.

NFC tags can also be used for diagnostic and maintenance purposes. The smart lighting system can write messages to the NFC memory such as requesting attention to a specific component, or any other change in condition. This can permit a maintenance worker to access the information via the NFC tag, even when the lighting system is powered down and is not delivering power to the NFC tag. The NFC tag can be used to store notes by the MCU that can be read by a maintenance worker to aid in the maintenance process. Similarly, the commissioning device can write information to the NFC tag such as the identity of the maintenance worker and what was done on the system. This and any other information can be read from the NFC tag by the MCU, which in turn can upload the maintenance information into a maintenance database (e.g., in the cloud). Other diagnostic or maintenance examples can include: timestamp capabilities for time spent by a worker on a maintenance job, alerting the system that maintenance is in progress, or extracting current system values like LED lifetime or fixture temperature. Moreover, the completion of the task, if desired, can trigger a payment process to the maintenance worker via the network. In various implementations, the NFC tag can be password protected. In further implementations, it is possible to control the fixture using the commissioning device via the NFC, wherein the commissioning device is configured or instructed to write instructions to the NFC to cause the light fixture to test some or all of its features when it receives power. Thus, the fixture can be configured to run self testing even if it is not connected to the network. Such a feature can be used at the end of the production line or in the field by a technician or if the network has a problem.

The NFC tag can be located at any suitable location in the light fixture. The location should be near an external portion of the fixture so that the commissioning device is able to communicate with it. For example, the NFC tag can be located in a non-metal material on the light fixture, and or in a separate housing that is attached to the fixture. If desired, the NFC tag can be located on the same Printed Circuit Board (PCB) as the MCU. In some implementations, the MCU and NFC tag can be located in the same housing external to the fixture. The present embodiments are ideal for use in light poles, but can also be used in other suitable arrangements.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means or device for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

Although the present disclosure herein has been described with reference to particular preferred embodiments thereof, it is to be understood that these embodiments are merely illustrative of the principles and applications of the disclosure. Therefore, modifications may be made to these embodiments and other arrangements may be devised without departing from the spirit and scope of the disclosure.

What is claimed is:

1. A lighting system, comprising:
    a) a light fixture including a lighting element;
    b) a microcontroller; and
    c) a near field communication tag in communication with the microcontroller, the near field communication tag including a memory accessible by the microcontroller, and an antenna for coupling with a wireless device;
    d) a computer network in communication with the microcontroller of the light fixture;
    wherein the microcontroller of the light fixture is configured to upload geolocation information received from the wireless device via the near field communication tag to the computer network upon reading it from the near field communication tag.

2. A lamp post including a lighting system according to claim 1.

3. The lighting system of claim 1, wherein the computer network includes a server and a database.

4. The lighting system of claim 1, wherein the microcontroller of the light fixture is configured to write information to the near field communication tag.

5. A processor-readable tangible non-transient medium storing a computer program for operating a lighting system according to claim 1, the computer program comprising:
    a) instructions for receiving information from the near field communication tag; and
    b) instructions for uploading the information from the near field communication tag to the computer network.

6. A NFC commissioning tool for a lighting system, comprising:
    a power source operably coupled to a processor;
    a GPS chip coupled to the processor;
    a NFC chip coupled to the processor; and
    a processor-readable tangible non-transient medium storing a computer program for operating a NFC commissioning tool for a lighting system comprising instructions for writing GPS information obtained from the GPS chip to a NFC tag of the lighting system via the NFC chip.

7. The NFC commissioning tool of claim 6, wherein the NFC commissioning tool is a smart phone running an application for operating the smart phone as a commissioning tool for a lighting system.

8. A method of commissioning a lighting fixture having an NFC tag with associated memory, comprising:
    establishing NFC communication with the NFC tag of the lighting fixture;
    writing data via NFC communication to the associated memory of the NFC tag;
        wherein data written comprises writing GPS coordinates to the associated memory of the NFC tag.

9. The method of claim 8, wherein data written comprises information related to a maintenance process.

10. The method of claim 9, further comprising:
    wherein data written comprises information for performing a self-test of the lighting fixture.

11. The method of claim 8, wherein data written comprises at least one of a QC phase, job name, group name, manufacture date, product ID, serial number and a timestamp.

12. The method of claim 8, further comprising:
    reading data from the associated memory of the NFC tag; and
    uploading the read data to a network.

13. The method of claim 8, wherein the method of commissioning is performed using a smartphone.

14. The method of claim 8, wherein the NFC tag supports the NFC data exchange (NDEF) format.

* * * * *